Dec. 1, 1931.    E. GRANGER    1,834,025
WATER METER
Filed March 13, 1928    2 Sheets-Sheet 1

INVENTOR
Ernest Granger,
BY
ATTORNEYS.

Dec. 1, 1931. E. GRANGER 1,834,025
WATER METER
Filed March 13, 1928 2 Sheets-Sheet 2

INVENTOR
Ernest Granger,
BY
ATTORNEYS.

Patented Dec. 1, 1931

1,834,025

UNITED STATES PATENT OFFICE

ERNEST GRANGER, OF PARIS, FRANCE

WATER METER

Application filed March 13, 1928, Serial No. 261,351, and in France March 16, 1927.

This invention relates to improvements in water or other fluid meters of the rotary piston type.

One of its objects is the provision of a meter of this character which is simple and compact in construction, which is reliable and efficient in operation and whose parts are so constructed to reduce friction to a minimum.

Other features of the invention reside in the detailed construction and arrangement of its parts hereinafter described, and particularly pointed out in the appended claims.

In the accompanying drawings:—

Figure 1:
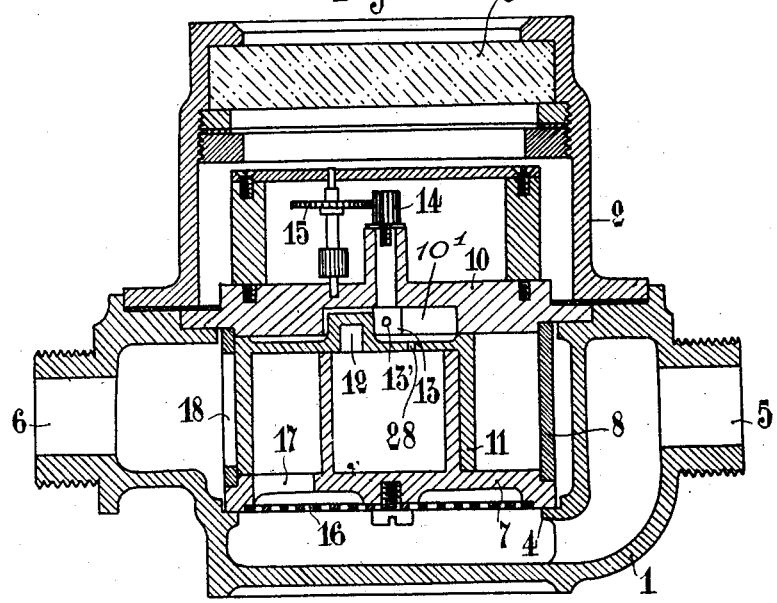
Figure 2:
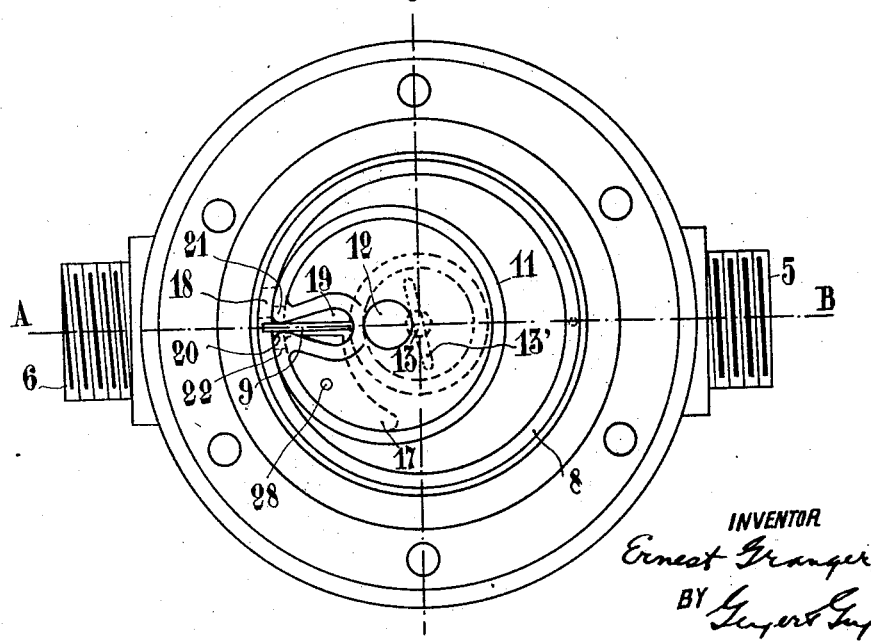
Figure 3:
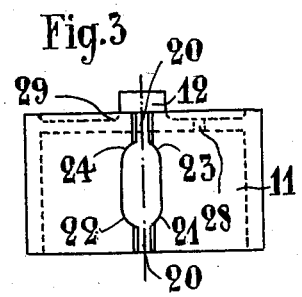
Figure 6:
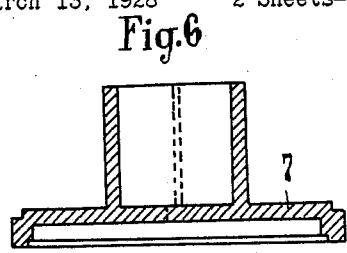
Figure 4:
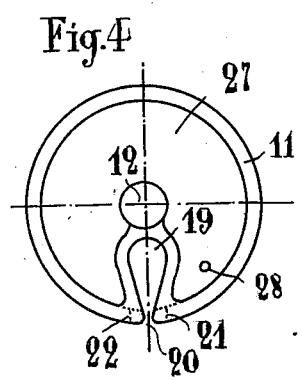
Figure 7:
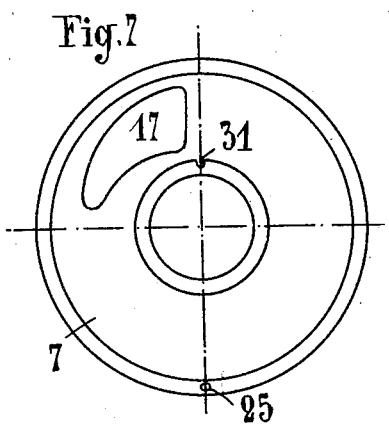
Figure 5:
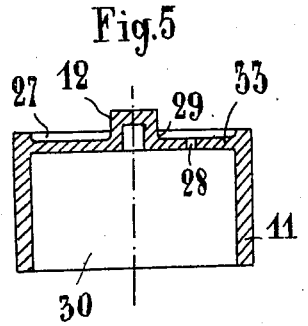
Figure 8:
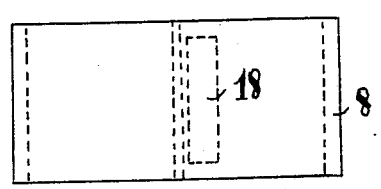
Figure 9:
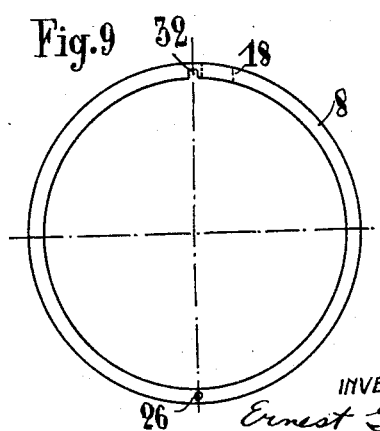

Figure 1 is a vertical longitudinal section of a water meter embodying my invention, taken substantially in the plane of line A—B, Figure 2. Figure 2 is a top plan view of the device with the top plate of the cylindrical chamber removed. Figures 3, 4 and 5 show a side elevation, a top plan, and a vertical section, respectively, of the rotary piston. Figures 6 and 7 show a vertical section and a top plan view, respectively, of the lower plate of the cylindrical chamber. Figures 8 and 9 show a side elevation and a plan view of the circular wall of the cylindrical chamber.

Similar characters of reference indicate corresponding parts throughout the several views.

As shown in Figure 1, the casing of the meter consists of a lower section 1 and an upper section 2 suitably joined by bolts or similar fasteners. Applied to the upper casing-section is a glass 3, through which the readings of the meter may be observed.

The lower casing-section 1 is provided adjacent its lower end with a partition 4, which divides the meter into superposed chambers, one having an inlet 5 for the admission of the fluid to be metered and the other having an outlet or exhaust 6 for the discharge of the metered fluid.

Supported on the partition 4 is a cylindrical chamber or casing consisting of a base plate 7, a circular wall or cylinder 8, a radial blade or partition 9, and a top plate 10. The radial disposition of the blade 9 is effected by opposing grooves 31 and 32 formed in the neck of the base plate 7 and in the inner side of the cylinder 8, respectively. To insure these grooves being maintained in their relative positions to receive the blade, the base plate 7 has a stud 25 rising therefrom which engages a corresponding opening 26 in the lower edge of the cylinder.

Operating eccentrically within the cylindrical chamber provided by the parts 7, 8 and 10 is a circular piston 11 provided at its top with a head or partition 33 carrying a central boss 12 that is adapted to travel in a circular path about the spindle 13 fitted with a driving bar 13′. At its upper end this spindle has a pinion 14 which is adapted to actuate the metering works 15 of any appropriate construction and operating in a lubricating bath.

In its underside the top plate 10 of the cylindrical chamber has a circular recess 10′ in which the bar 13′ and boss 12 are free to operate, said recess also constituting a balancing chamber for the piston 11.

The head 33 of the piston 11 divides the latter in conjunction with the top plate 10 into two chambers 27 and 30, and one or more openings 28 in said partition provide for intercommunication between the chambers. This construction affords an absolute balancing of the piston since the fluid pressure is exerted equally on both faces of the piston head.

The fluid to be metered, after passing through the inlet 5 into the lower portion of the casing-section 1, is admitted to the cylindrical chamber formed by the parts 7, 8 and 10 through a substantially crescent-shaped inlet port 17 located in the base plate 7 of said chamber. Before entering this chamber, the fluid is filtered through a large-surfaced strainer 16 applied to the lower side of the base plate 7. The fluid imparts a circular motion to the piston 11 and is discharged from the working cylinder through an outlet port 18 formed in the cylindrical wall 8. As shown in Figure 2, the inlet port 17 is arranged at one side of the blade 9 and the outlet port 18 is arranged on the opposite side thereof. The head of the piston 11 is hollowed out or recessed in an outwardly-converging manner, as shown at 19, in order to permit of the action of the piston relative to the blade 9. The piston is also slit at 20 in order to permit guidance of the piston relative to the blade and the same is also slit intermediate its upper and lower ends, as shown at 21 and 22, in order to permit of the admission and discharge of extreme volumes of the fluid as well as to reduce the surface of friction on the diaphragm.

As shown in Figure 3, the corners 23 and 24 of the opening resulting from the slits 21 and 22, and the corners 29 of the boss 12 are preferably rounded.

The various parts of this device which come in contact with the liquid to be metered should be made of a suitable material to withstand the corrosive effect produced thereby, and I prefer to use ebonite, nickel or like material.

By applying power to the spindle 13 this device may be used as a volumetric pump.

The present embodiment of my invention has been disclosed merely by way of example, and it is to be understood that various changes in the details of construction and arrangement of parts may be made in accordance with the spirit and scope of the invention as defined in the appended claims.

I claim as my invention:—

1. A water meter of the character described, comprising a casing having an inlet and an outlet, a cylindrical chamber housed within said casing and having ports communicating with the casing-inlet and casing-outlet, said chamber including top and bottom walls and spaced inner and outer concentric walls therebetween, a blade disposed radially of said chamber between its inlet and outlet, and an inverted cup-shaped rotary piston eccentrically operable in said chamber between its concentric walls and spaced from its top wall to provide an auxiliary chamber, the top wall of said piston having a port therein for establishing communication between said first-named chamber and said auxiliary chamber.

2. A fluid meter, comprising a cylindrical chamber including spaced inner and outer concentric walls and having an inlet and an adjoining outlet, a radial partition in said chamber between its concentric walls and separating the inlet from the outlet, and an inverted cup-like piston revolvable in said chamber in eccentric relation thereto and in constant peripheral contact with its outer wall, the head and lower edge of the piston bearing against the corresponding walls of said chamber and said piston-head having a depression in its top surface, forming with the top wall of said chamber, an auxiliary fluid balancing chamber, said piston-head having a port therein for establishing communication between said chambers, respectively.

3. A water meter of the character described, comprising a casing containing a main cylindrical chamber having an inlet and an outlet for the fluid, a blade disposed substantially radially of the cylinder between its inlet and outlet, an inverted, cup-shaped rotary piston operable in said chamber, and a supplementary chamber disposed between the top wall and the top wall of the main chamber over the piston, the top wall of said piston having a port for establishing communication between said main chamber and said supplementary chamber.

4. A water meter of the character described, comprising a casing having inner and outer concentric walls forming a main chamber and a downwardly-facing recess formed in the top wall thereof and constituting a relatively small auxiliary chamber, said main chamber having an inlet and an outlet, a blade disposed substantially radially of the main chamber between its inlet and outlet, and an inverted cup-shaped piston operable in said main chamber and having a top wall constituting a partition between the main chamber and the auxiliary chamber, said top wall having an opening for establishing communication between said chambers.

5. A water meter of the character described, comprising a casing having inner and outer concentric walls forming a chamber having an inlet and an outlet for the fluid, a radially-disposed blade in said chamber between its inlet and outlet, and an inverted, cup-shaped rotary piston operable in said chamber and having a slot in its side wall and a communicating notch in its top wall for receiving the blade and permitting movement of the piston relative to said blade, the slot in said piston being enlarged intermediate its ends to effect the admission and discharge of extreme volumes of the fluid.

6. A water meter of the character described, comprising a casing having an inlet and an outlet, a main cylindrical chamber housed within said casing and including a bottom wall, a top wall and concentric intermediate walls, said chamber having an inlet and an outlet communicating with the casing-inlet and casing-outlet, respectively, the top wall of said chamber having a centrally disposed downwardly-facing recess constituting an auxiliary chamber, a blade disposed in said chamber between its inlet and outlet, a circular rotary piston of inverted cup-like shape eccentrically operable in said main chamber and having a driving element rising therefrom into the auxiliary chamber, the top wall of said piston having an opening therein for establishing communication between said main chamber and said auxiliary chamber, and a registering mechanism carried by the top wall of the main chamber and having a driven element in operative engagement with the piston-driving element.

In witness whereof I have hereunto set my hand.

ERNEST GRANGER.